(12) United States Patent
Fujieda et al.

(10) Patent No.: US 7,450,248 B2
(45) Date of Patent: Nov. 11, 2008

(54) THREE-DIMENSIONAL MEASURING METHOD AND THREE-DIMENSIONAL MEASURING APPARATUS

(75) Inventors: Shiro Fujieda, Kyoto (JP); Yasuyuki Ikeda, Ayabe (JP)

(73) Assignee: Omron Corporation, Kyoto-Shi (JP)

( * ) Notice: Subject to any disclaimer, the term of this patent is extended or adjusted under 35 U.S.C. 154(b) by 365 days.

(21) Appl. No.: 11/452,433

(22) Filed: Jun. 14, 2006

(65) Prior Publication Data
US 2006/0285752 A1      Dec. 21, 2006

(30) Foreign Application Priority Data
Jun. 17, 2005    (JP)    ............... 2005-178544

(51) Int. Cl.
    *G01B 11/24*    (2006.01)
    *G06K 9/00*    (2006.01)
(52) U.S. Cl. .................. 356/601; 356/611; 382/154
(58) Field of Classification Search ............... 356/601, 356/611; 382/154
    See application file for complete search history.

(56) References Cited
U.S. PATENT DOCUMENTS
5,850,352 A * 12/1998 Moezzi et al. ............ 345/419

2002/0051006 A1 * 5/2002 Katagiri et al. ............ 345/653
2005/0002558 A1 * 1/2005 Franke et al. ............... 382/154

FOREIGN PATENT DOCUMENTS
EP      1 085 769      3/2001
JP      2002-099902    4/2002

OTHER PUBLICATIONS

Miichi et al., "Calibration of Projector-Camera System," http://research.microsoft.com/zhang/Calib/, 8 pages.
Petty et al., "3D Measurement Using Rotating Line-Scan Sensors," Measurement Science and Technology, vol. 9, No. 3, Mar. 1, 1998, pp. 339-346.

* cited by examiner

*Primary Examiner*—Roy M Punnoose
(74) *Attorney, Agent, or Firm*—Foley & Lardner LLP

(57) ABSTRACT

After calibration for three-dimensional measurement has been completed, specification of a range of height to be measured is accepted, and using a homography matrix corresponding to the specified range on each of the images A0 and A1 from respective cameras, a range is extracted where a point included in the viewing fields of both of the cameras appears among points in the specified height range. Further, the extracted range is color-displayed as a measurable range on each of the images A0 and A1.

10 Claims, 9 Drawing Sheets

Fig. 4 (1)
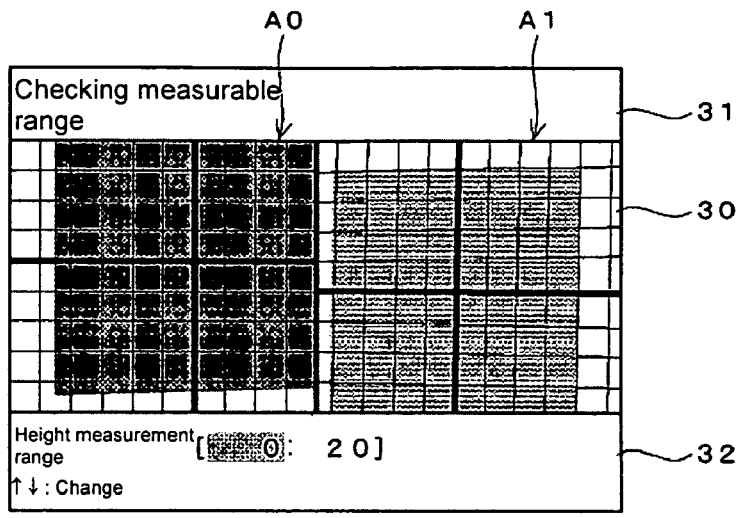
Fig. 4 (2)
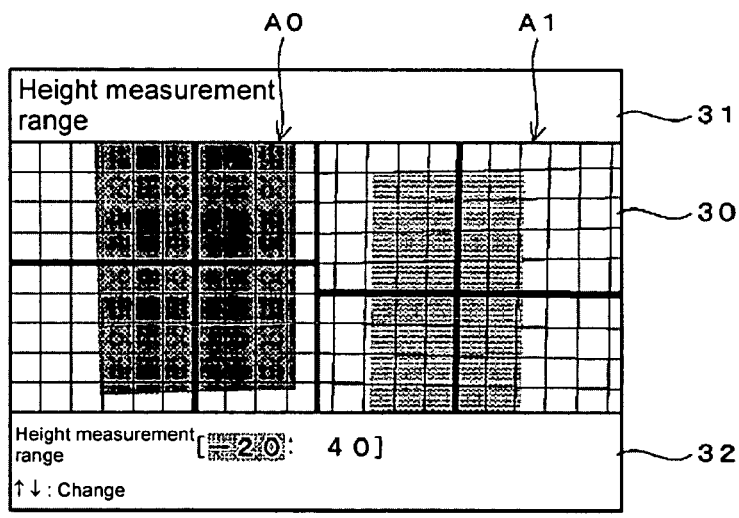
Fig. 4 (3)
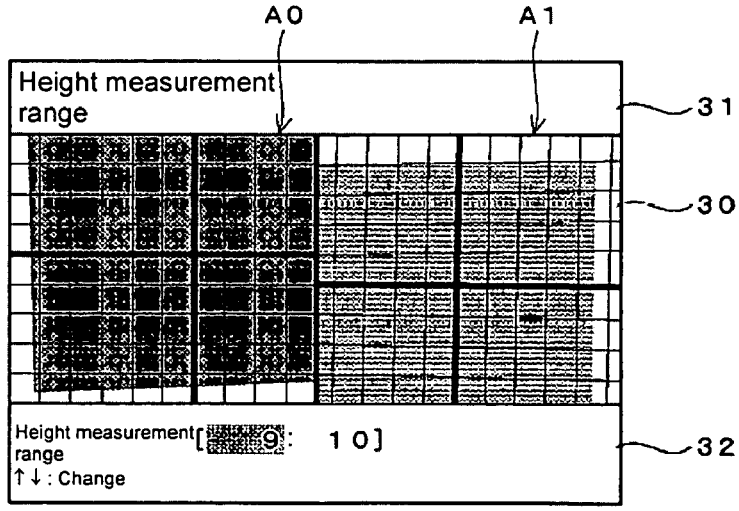

THREE-DIMENSIONAL MEASURING METHOD AND THREE-DIMENSIONAL MEASURING APPARATUS

This application claims priority from Japanese patent application JP P2005-178544, filed on Jun. 17, 2005. The entire content of the aforementioned application is incorporated herein by reference.

BACKGROUND OF THE INVENTION

1. Field of the Invention

The present invention relates to a method for executing three-dimensional measurement processing on a range where viewing fields of a plurality of cameras overlap by using images produced with the plurality of cameras, and a three-dimensional measuring apparatus for executing the method.

2. Description of Related Art

In three-dimensional measurement processing based upon the binocular vision principle, images of an object to be measured are picked up with each of two cameras or more from different directions, and respective feature points on the produced images which represent an identical image are corresponded to each other. A coordinate of the feature point extracted from each of the images is substituted into an operational expression to calculate a three-dimensional coordinate (refer to, for example, Japanese Patent Application Laid-Open No. 2002-99902).

Performing the measurement processing as shown in Japanese Patent Application Laid-Open No. 2002-99902 above requires inclusion of each point to be measured in viewing fields of all cameras. This necessitates adjustment of a positional relation among each of the cameras based upon a range where the object to be measured is included or a height range that the measuring object can take to secure the accuracy of three-dimensional measurement.

However, it is highly difficult to recognize the range or the height range where viewing fields of all the cameras overlap. Especially in a case where the apparatus is used by a user lacking expertise on three-dimensional measurement, the user adjusts cameras by trial and error without knowing how to adjust the cameras, thereby to come into a state suitable for measurement. Hence the adjustment operation can be time and labor consuming.

SUMMARY OF THE INVENTION

The present invention was made taking note of the above-mentioned problem, and has objects to set each camera into a state according to a measuring purpose and allowing easy execution of processing to check that such setting has been made.

When it is assumed that an image of a flat surface positioned at a prescribed height is picked up with each of a plurality of cameras, a coordinate relation of pixels corresponding to each other among the produced images is expressed by an expression using a matrix, which is called homography (cf. "Calibration of Projector-Camera System", Nobuhiro Miichi, Toshikazu Wada, Takashi Matsuyama, <URL:

http://vision.kuee.kyoto-u.ac.jp/Research/Thesis/Thesis_PDF/Miichi_2002_P_1 47.pdf> searched on Jun. 1, 2005)

Therefore, once a relation (distance between origin points, rotational deviation of a coordinate axis, etc.) of a camera coordinate system among cameras is revealed, when one point located at a prescribed height within spaces forms an image on an image pickup surface of one camera, it is possible to convert a coordinate of the image formation position to a coordinate on an image pickup surface of another camera by substituting the coordinate of the image formation position into an relational expression using a homography matrix according to the height of the point. When the coordinate after the conversion is included in the range of an actual image pickup surface of the camera, it can be considered that the one point within spaces is a point which is included in the viewing fields of all the cameras and at which three-dimensional measurement is possible.

In order to simplify the description, it is assumed here that two cameras A and B are arranged and a virtual flat surface having a specific height and an infinite area is an object to be measured. In this case, it can be considered that an image of a point at an arbitrary position on the virtual flat surface is formed on every pixel constituting an image pickup surface of any camera. Therefore, when coordinates of points on an image on the camera B side are obtained, the points corresponding to all pixels that constitute an image picked up with the camera A by using homography matrixes according to the height of the virtual flat surface, a coordinate included in the range of the actual image picked up with the camera B among the above-obtained points can be considered to correspond to the points included in both the viewing fields of the cameras A and B. In other words, it can be considered that the set of coordinates of the corresponding points indicates a range where a three-dimensional coordinate can be calculated on the virtual flat surface.

In the following, a range which appears on the image and in which three-dimensional measurement can be performed is referred to as a "measurable range".

It is to be noted that, since an image pickup surface of a camera is rectangular, instead of obtaining coordinates of points corresponding to all pixels on an image as described above, respective coordinates of points corresponding to four points as vertices of an image are obtained, and a rectangular region formed by connecting these corresponding points can be taken as the measurable range. Further, also as for the image pickup surface of the camera A, a region corresponding to all pixels on the image pickup surface of the camera B are extracted so as to obtain the measurable range in the same manner as described above.

Further, when the height of the virtual flat surface changes within a prescribed range, a homography matrix changes according to the change in height, and the measurable range can also fluctuate. In this case, for reliable measurement of a point within the height changing range, a range including all measurable ranges corresponding to respective heights in the height range, namely a range where all measurable ranges overlap, needs to be limited to an object to be measured.

The present invention was made based upon the above-mentioned consideration, and is directed to facilitate recognition of a range (range on a supporting surface of an object to be measured or height range of the object to be measured) measurable by a user in a method and a device for executing three-dimensional measurement processing on a range where viewing fields of a plurality of cameras overlap by using images produced with the plurality of cameras.

It should be noted that in this specification, the "supporting surface" of the object to be measured includes not only a horizontal surface but also a surface being off horizontal. Further, "height" can be translated to a "distance from the supporting surface".

First, in a first three-dimensional measuring method according to the present invention, a first step and a second step are executed. The first step is accepting specification of a range of height to be measured. The second step is extracting, with respect to an image produced with at least one of the cameras, an area where a point which is included in the viewing fields of all the cameras throughout the height range specified in the first step appears on the image by using a relation of a camera coordinate system between each of the cameras.

In the above situation, in the first step, the user can specify arbitral upper and lower limits of the height.

In the second step, using the above-described method, respective measurable ranges of images picked up with all the cameras are obtained according to the upper and lower limits of the height range, and a part where these ranges overlap can be taken as an area (measurable range corresponding to the height range) where a point appears which is within the height range specified in the first step and included in the viewing fields of all the cameras.

In one preferred embodiment of the present invention, a third step is further executed. The third step is displaying an image produced with the camera as an object for processing of the second step, along with the area extracted in the second step.

In the third step, for example, it is possible to display an image having been produced with the camera as the object for the processing of the second step and added with a boundary of the range extracted in the second step. Further, the image whose display modes within and outside the range are different may be displayed, for example by coloring the image within the range with a prescribed color. Further, only the image within the range may be displayed.

According to the above-described method, when the user specifies the range of height to be measured, an image indicating a relation between a viewing field and a measurable range of at least one camera is displayed, thereby allowing the user to readily recognize a range where the height within the specified range is measurable so as to determine whether or not each of the cameras has been set in a manner suitable for a measurement purpose.

In one preferred embodiment of the present invention, the first step further includes a step of accepting specification of a measuring object range on a supporting surface of an object to be measured, and a fourth step and a fifth step are further executed. The fourth step is determining with respect to the camera as the object for the processing of the second step whether or not the measuring object range on the image is included in the range extracted in the second step. The fifth step is outputting a result of the determination in the fourth step.

In the first step, it is possible to specify an arbitrary measuring object range according the size of the object to be measured or a position the object to be measured can take. Such specification is preferably made on a display screen of an image from any one of the cameras as described later, but is not limited to this. For example, a border line of the measuring object range is marked on the supporting surface of the object and its image is picked up with at least one of the plurality of cameras to extract the border line from the produced image, whereby it is possible to recognize the measuring object range. It is also possible to specify the measuring object range by a method of inputting a specific three-dimensional coordinate of each vertex of the measuring object range.

According to the above embodiment, when the user specifies the measuring object range along with the height range, the measurable range according to the height range is extracted by the second step based upon the same principle as of the first method. Further, in the fourth step, it is determined whether or not the specified measuring object range is included in the measurable range.

In the fifth step, it is possible to display the determination result along with an image from the camera. Further, when the measuring object range exceeds the measurable range, the height of the object may not be measured even with the object being within the height range specified by the measuring object range. In this case, it is desirable to produce an output such as displaying an alert message or sounding an alert to notify the user of the inappropriate range specification.

In one preferred embodiment of the present invention, a sixth step is further executed. The sixth step is displaying an image from the camera as the object for the processing of the second step while accepting specification of a measuring object range in a region corresponding to the area extracted in the second step.

In the above embodiment, after specifying the range of height to be measured, the user is to perform an operation for specifying the measuring object range on a display screen of an image of any one of the cameras. According to the third step, since the range that can be specified as the measuring object range is limited to the range where a point within the previously specified height range can be measured with certainty, such a range where measurement cannot be made is not specified, thereby ensuring measurement accuracy.

It is to be noted that, for example when the upper left vertex and the lower right vertex of the measuring object range are specified, in the sixth step, a cursor setting range can be limited such that the cursor does not move outside the measurable range. Further, only an image in the measurable range may be displayed and the specification operation may be accepted only in the above displayed range.

In a second three-dimensional measuring method according to the present invention, a seventh step, an eighth step and a ninth step are executed. The seventh step is accepting specification of a measuring object range on a supporting surface of an object to be measured. The eighth step is obtaining a height range of a point included in the viewing fields of all the cameras among points belonging to the measuring object range by using a relation of a camera coordinate system between each of the cameras. The ninth step is outputting the height range obtained in the eighth step.

In the above situation, in the eighth step, as the height of the virtual flat surface is moved by a prescribed unit, the measurable range corresponding to each height is extracted so that height can be obtained which corresponds to the measurable range capable of including the measurable range specified in the seventh step. It is therefore possible to obtain the height range from the set of these heights.

According to the second method, the user specifies the measuring object range considered as required, so as to be notified of a height range of a point included in the viewing fields of all cameras among points at a variety of heights which belong within the specified range, namely a height range of a point where the three-dimensional measuring method can be performed.

The above-mentioned first and second methods can be conducted, in advance of intended measurement, for the purpose of setting the cameras so as to properly perform the measurement or checking whether or not the cameras have come into such setting states. Further, if a non-defective product is determined to be defective, the first and the second methods can be conducted for the purpose of checking whether or note the three-dimensional measurement has been executed in a proper manner.

An apparatus for executing the first three-dimensional measuring method includes: an input means of inputting a range of height to be measured; and an area extracting means of extracting, with respect to an image produced with at least one of the plurality of cameras, an area where a point which is included in the viewing fields of all the cameras throughout the height range inputted by the input means appears on the image by using a relation of a camera coordinate system between each of the cameras.

In the above situation, the input means can be comprised of a mouse, a console, a keyboard and the like. The range extracting means can be comprised of a computer where a program according to the processing of the range extracting means is stored.

One preferred embodiment of the present invention further includes: a display image producing means for producing a display image that represents an image, produced with the camera as the object for the processing of the area extracting means, along with the area extracted by the area extracting means; and an image outputting means of outputting the display image.

The display image producing means can be comprised of a computer where a program according to the processing of the area extracting means is stored. The image outputting means can be comprised as an interface circuit with respect to a monitor device for image display.

One preferred embodiment of the present invention further includes: a first range specification accepting means of displaying on a display screen an image from any one of the plurality of cameras while accepting an operation of specifying a measuring object range on the display screen; a determining means of determining whether or not the specified measuring object range is included in the area extracted by the area extracting means; and an output means of outputting a result of the determination by the determination means. The area extracting means extracts the area with respect to the camera as an object for range specification of the range accepting means.

The input means is the same as that of the first apparatus. Each of the other means can be comprised of a computer where a program according to the processing of the means is stored. However, in the output means, an interface circuit with respect to a monitor or external equipment is desirably included.

The first range identification accepting means can be configured as a machine-machine-interface which displays an image from a prescribed camera on a monitor device, and a cursor or the like for range specification is displayed while being overlapped on the above-mentioned displayed image to accept a specification operation.

The area extracting means is basically the same as in the above-mentioned embodiment, and the extraction processing may be executed at least on an image from the camera as the object for range specification.

The output means may be configured as a means of displaying information as to whether or not the range specification has been appropriate on the display screen of the same image as at the time of the range specification. In addition to this, the output means can be configured so as to output an alert or the like when the range specification is not appropriate.

One preferred embodiment of the present invention includes a second range specification accepting means of displaying an image from the camera as an object for processing of the area extracting means and accepting specification of a measurement range within the area on the image extracted by the area extracting means.

Moreover, an apparatus for executing the second three-dimensional measuring method includes: a range specification accepting means of displaying an image from any one of the plurality of camera and accepting an operation of specifying a measuring object range on this display screen; a height-range extracting means of using a relation of a camera coordinate system between each of the cameras to extract a height range of a point included in the viewing fields of all the cameras among points belonging to the measuring object range within spaces; and an output means of outputting the height range obtained by the height-range extracting means.

The output means of the second apparatus is desirably configured as a means of displaying the height range. (This means is, for example, comprised of: a computer for producing information for display to control a display operation of a monitor; and an interface for display.) The display in this case is not limited to mere numeral value display. For example, the height range seen with the supporting surface of the object to be measured as a reference may be graphically displayed.

Further, in the first and second three-dimensional measuring apparatuses, the camera as the object for specifying the measuring object range can be configured to be set in a state where an optical axis is made orthogonal to the supporting surface of the object to be measured. With such a configuration, an image of the object to be measured and its supporting surface which are picked up from the front can be produced, thereby allowing specification of the measuring object range at the same intervals as in specification of the range on the actual supporting surface.

Further, in the three-dimensional measuring apparatus according to the present invention, a means for outputting (including displaying) the measurement processing result outside. Further, when this apparatus is used for inspection purpose, it is possible to arrange in the apparatus a means of comparing the measurement processing result with a prescribed threshold, a means of outputting "OK" (a good determination signal) or "NG" (a poor determination signal), or some other means.

Since the present invention can facilitate checking by the user whether or not each point within a range to be measured can be measured with certainty, even a user having poor knowledge of the three-dimensional measurement can readily perform setting and adjustment of cameras. Further, since the measurable range on the supporting surface and the measurable height range can be notified to the user even during the measurement processing, it is possible to readily grasp whether or not conditions have been set so as to properly execute the intended three-dimensional measuring method.

BRIEF DESCRIPTION OF THE DRAWINGS

FIGS. 4(1), 4(2) and 4(3) show explanatory views of examples of measurable range display;

DETAILED DESCRIPTION OF THE PREFERRED EMBODIMENTS

Figure 1:
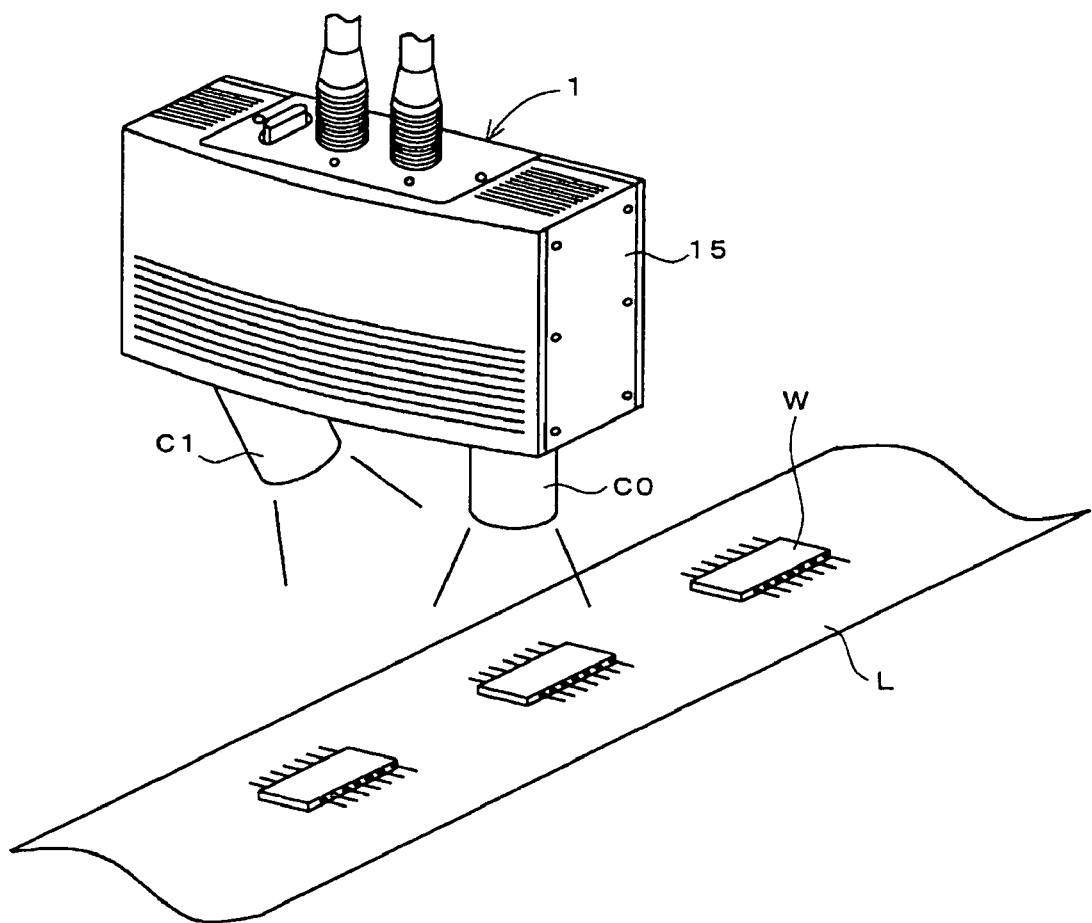
FIG. 1 shows an oblique view of a configuration, along with an installation example, of an image pickup part of an inspection apparatus to which the present invention has been applied.

FIG. 1 shows a configuration, as well as an example of installation, of an image pickup part of an inspection apparatus to which the present invention has been applied.

The inspection apparatus of this example has both three-dimensional and two-dimensional measurement processing functions, and sequentially picks up an image of each inspection object W (hereinafter referred to as "work W"), conveyed along an inspection line L in a factory, with an image pickup part 1 to execute measurement processing and determination processing according to a variety of inspection purposes.

The image pickup part 1 is configured by incorporating two cameras C0 and C1 into a housing 15 having a prescribed size, and installed on the upper part of the inspection line L. The one camera C0 is installed in a state where its optical axis is turned in a vertical direction. The other camera C1 is installed in a state where its optical axis is inclined so as to make its viewing field and the viewing field of the camera C0 overlap. In such installation, the camera C0 produces an image (hereinafter, an image on the camera C0 side is referred to as "front view image") indicating the state of the top surface of the work W seen from the front side. The other camera C1 produces an image (hereinafter referred to as "inclined image") of the work W in an inclined state.

Figure 2:
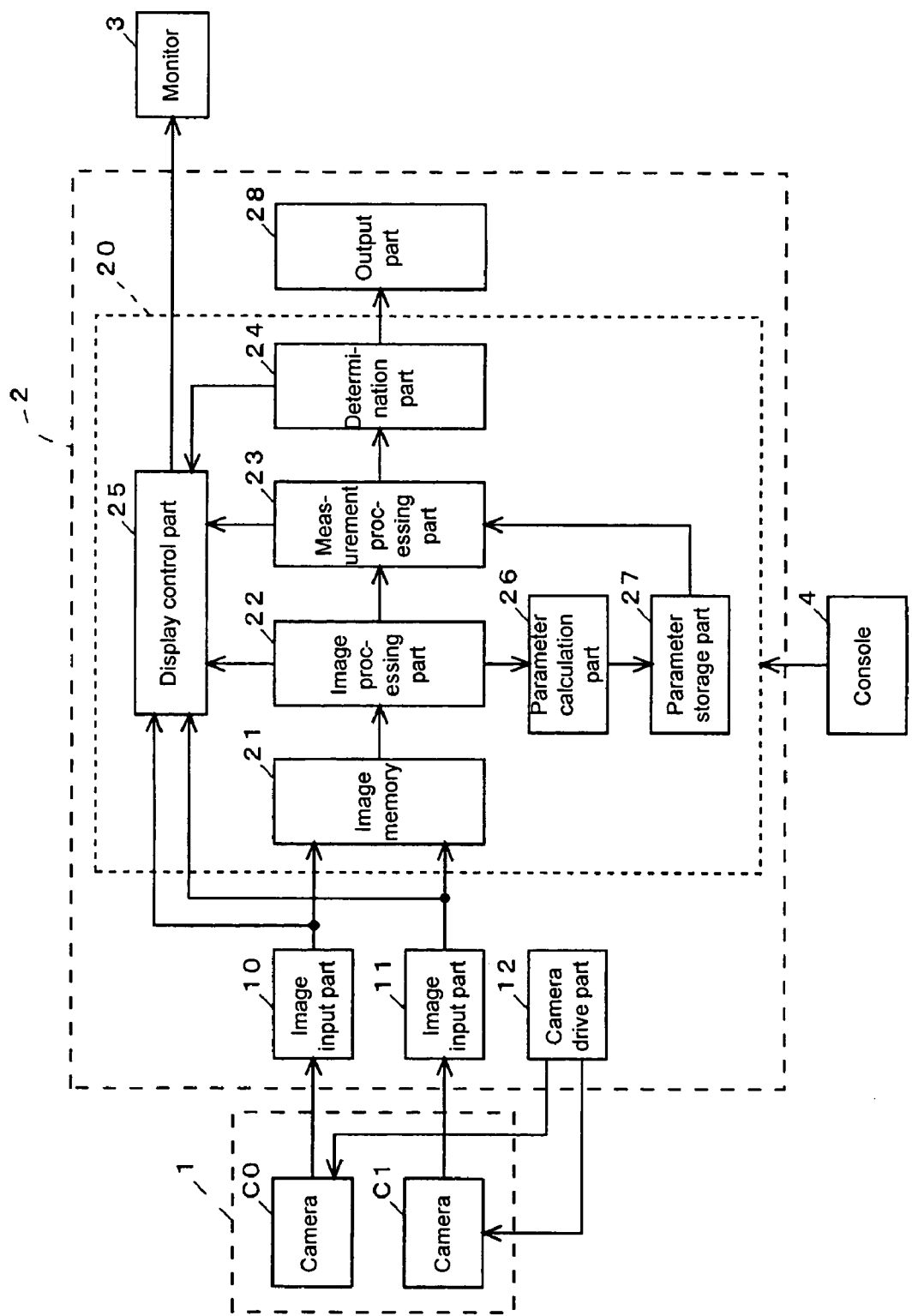
FIG. 2 shows a block diagram of the inspection apparatus.

FIG. 2 is a block diagram showing an overall configuration of the inspection apparatus. This inspection apparatus is comprised of a body 2, a monitor 3, a console 4 and the like in addition to the image pickup part 1. The body 2 is provided with image input parts 10 and 11 with respect to the cameras C0 and C1, a camera drive part 12, an operation processing part 20, an output part 28 and the like.

The camera drive part 12 simultaneously drives the cameras C0 and C1 upon acceptance of a detect signal from a sensor for work detection, not shown in the figure. Image signals produced with the cameras C0 and C1 are respectively inputted into the image input parts 10 and 11 and then digital-converted. Thereby, a digital image for measurement processing (the above-described front view image and inclined image) is produced with each of the cameras.

The operation processing part 20 is comprised of a computer or the like. After executing the measurement processing using the images produced with the respective cameras, the operation processing part 20 determines the propriety of the work W from the processing results. The output part 28 is an interface for output which serves to output results of the measurement processing and the determination processing to external equipment such as a PLC.

The operation processing part 20 is provided with an image processing part 22, a measurement processing part 23, a determination part 24, a display control part 25, a parameter calculation part 26, a parameter storage part 27 and the like, in addition to an image memory 21 for storing the above-mentioned images A0 and A1. It is to be noted that each of the parts other than the image memory 21 and the parameter storage part 27 is a function set in the computer according to a program for exclusive use. The image memory 21 and the parameter storage part 27 are set in a memory (RAM etc.) of the computer.

It should be noted that, although not shown in FIG. 2, the operation processing part 20 is also provided with a memory for registering information (conditions for setting an inspection region, image of a model, etc.) required for inspection (hereinafter, this memory is referred to as "memory for register"). It is possible to execute processing for register into this memory for register, and setting or changing of processing which is executed with the each processing parts of the operation processing part 20 can be executed as appropriate according to the operation of the console 4.

In the image processing part 22, a measuring object point of the inspecting object area of the work W is extracted from the front view image, and thereafter, a point on the inclined image which corresponds to the extracted point to be measured is detected on the inclined image. The measurement processing part 23 performs an operation using coordinates of points extracted with the image processing part 22 to calculate three-dimensional coordinates corresponding to these points.

The determination part 24 compares the three-dimensional coordinates obtained by the measurement processing part 23 with coordinates at prescribed reference positions, to determine the propriety of the work W. A result of this determination is outputted to the output part 28 and the display control part 25.

The display control part 25 serves to control the display operation of the monitor 3, and is capable of displaying in parallel the front view image and the inclined image which were respectively produced with the image input parts 10 and 11. Further, the display control part 25 is capable of receiving processing results of the image processing part 22, the measurement processing part 23 and the determination part 24 as appropriate to display those results along with the above-mentioned images.

A variety of coefficients included in an operational expression for the three-dimensional measurement are stored into the parameter storage part 27. Values of these coefficients fluctuate according to a relation between a stereo coordinate system configured with each camera and a space coordinate system representing an actual position in spaces (distance between origin points of the respective coordinates, rotational deviation of the stereo coordinate system with respect to the space coordinate system, etc.) (hereinafter, each of these coefficients is referred to as "parameter"). Prior to inspection, these parameters are calculated with the image processing part 22 and the parameter calculation part 26, and stored into the parameter storage part 27. Further, a parameter constituting a homography matrix of a later-described operational expression (1) is also stored into the parameter storage part 27.

It is to be noted that a work for calibration having a plurality of feature points is used in the processing for calculating the parameters.

Moreover, in the inspection apparatus of this example, whether or not a range where the three-dimensional measurement is executable (measurable range) is appropriate can be checked on the screen after the calibration has been executed. This processing is performed using a homography matrix obtained by combination of the parameters set in the parameter storage part 27 and functions of the image processing part 22, the measurement processing part 23 and the display control part 25.

Figure 3:
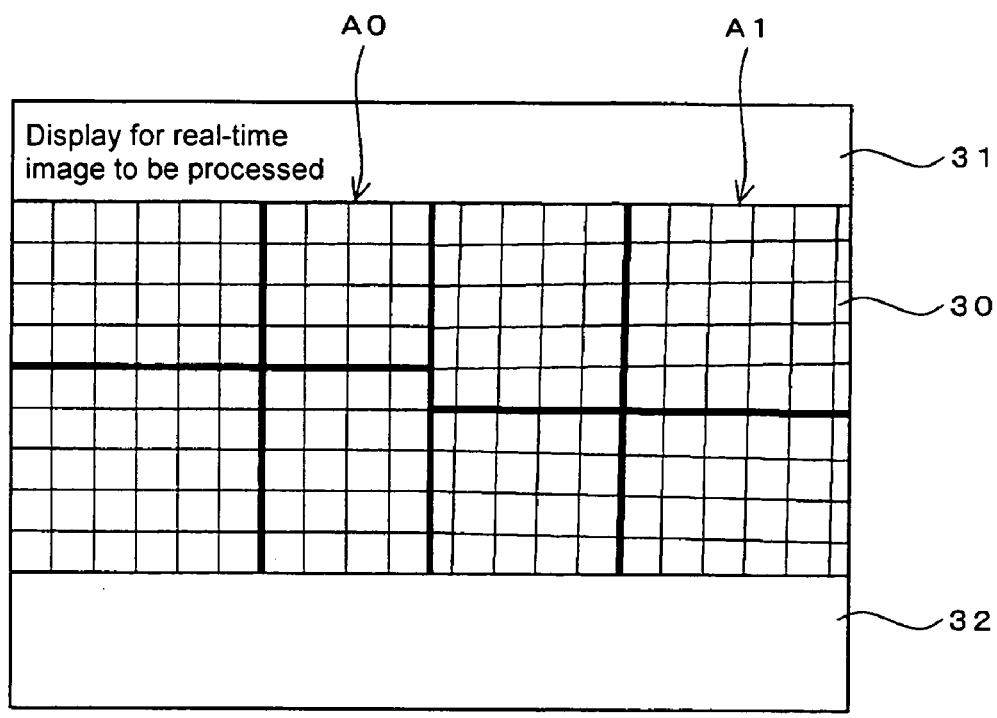
FIG. 3 shows an explanatory view of a display screen at the time of picking up an image of a work for calibration.

FIG. 3 shows a screen of the monitor 3 in picking up images of the work for calibration with the cameras C0 and C1. The screen of this example is split into three in a vertical direction. Images from the cameras C0 and C1 are displayed in a center region 30, and a variety of messages, an input state of a setting value and the like are displayed in a top region 31 and a bottom region 32. Further, the display region 30 of the image is split into right and left. A front view image A0 from the camera C0 is displayed on the left side while an inclined image A1 from the camera C1 is displayed on the right side.

On the work for calibration of this example, a pattern (grid-like pattern) is formed by arranging a plurality of straight lines at even intervals in horizontal or vertical directions. Further, in order to facilitate positioning of the work for calibration and also specify a positional relation among feature points (intersections of the grid-like pattern), the center straight line of each of the directions is made thicker than other straight lines.

A visual difference appears between the images A0 and A1 in the region 30 associated with the relation between camera coordinate systems of the cameras C0 and C1. Further, each straight line on the image A1 are slightly inclined with respect to the horizontal and vertical directions.

In this example, the user is allowed to specify a range of height to be measured (hereinafter referred to as "height measurement range"). Thereby, a range (measurable range corresponding to the height measurement range) is obtained where a point, which is within the height measurement range and included in both of the viewing fields of the cameras C0 and C1, appears on images which are picked up with the cameras, and the images A0 and A1 reflecting the obtained measurable range are displayed. FIG. 4 shows examples of such display. It is to be noted that in these examples, the height is represented with a prescribed height position of 0 as a reference, and a unit is mm.

In FIG. 4, (1) shows a display example with a height measurement range of 0 to 20 mm, (2) shows a display example with a height measurement range of −20 to 40 mm, and (3) shows a display example with a height measurement range of 9 to 10 mm. In any of the examples, the measurable range on the images A0 and A1 with respect to the height measurement range is colored with a prescribed color. (In FIG. 4, the colored parts are solidly shaded in a prescribed pattern.) Therefore, based upon whether or not the range that can be included in the work W is colored, the user can determine whether or not setting has been made so as to properly execute the three-dimensional measurement with respect to the work W.

Further, in the bottom information display region 32 of each of the screens of the examples in FIG. 4, the height measurement range which is currently set, information (upward and downward allows) on an operation for changing the set range and the like are displayed. Operating the upward and downward arrow keys (not shown) of a console under this condition enables a change in the height measurement range. Accordingly, even when the displayed measurable range is not appropriate, the user can change the height measurement range so as to adjust the measurable range to an appropriate range.

Figure 5:
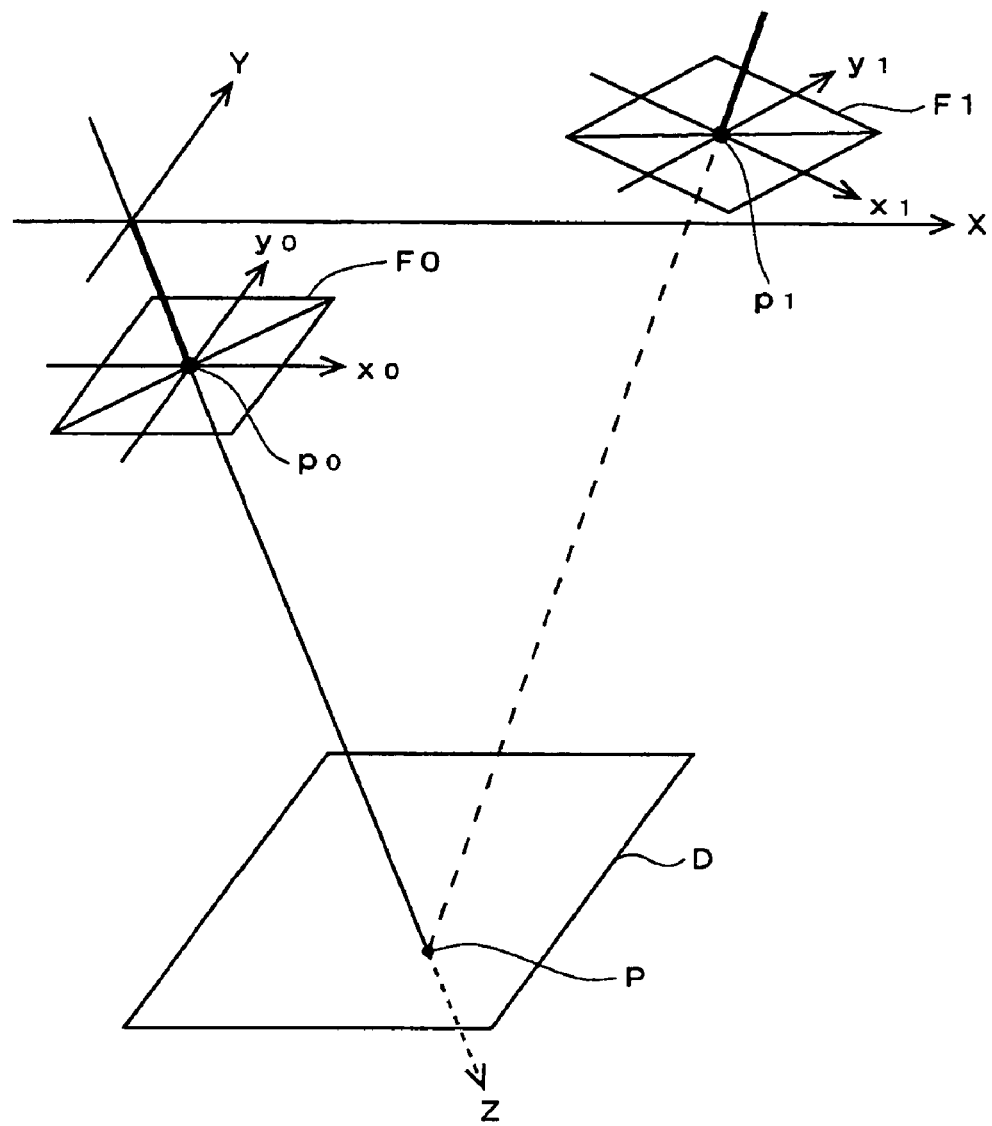
FIG. 5 shows an explanatory view of a relation between corresponding points on respective images.

Next, a method for obtaining the measurable range is described. FIG. 5 shows a state where images of one point P on a flat surface D at a prescribed height position within spaces is formed at points $p_0$ and $p_1$ on the image pickup surfaces F0 and F1 of the cameras C0 and C1, respectively. It should be noted that in FIG. 5, X, Y and Z are coordinate axes representing a three-dimensional space, and D is in parallel with the X-Y flat surface. Moreover, a two-dimensional coordinate system formed by axes $x_0$ and $y_0$ is set on the image pickup surface F0, and a two-dimensional coordinate system formed by axes $x_1$ and $y_1$ is set on the image pickup surface F1. The images A0 and A1 are produced by signals from photo acceptance cells of the image pickup surfaces F0 and F1, respectively.

In the above situation, it is assumed that a coordinate of the image forming position (point $p_0$) of the point P on the image pickup surface F0 is $(x_{cam0}, y_{cam0})$, and a coordinate of the image forming position (point $p_1$) of the point P on the image pickup surface F1 is $(x_{cam1}, y_{cam1})$. Here, when it is assumed that height Z of the flat surface D changes from ZA to ZB (ZA<ZB), the relation between the points $p_0$ and $p_1$ can be expressed by expressions (1) and (2) as follows. It is to be noted that dH in the expressions (1) and (2) is obtained by an expression (3).

(Mathematical Expression 1)

$$\lambda \begin{bmatrix} x_{cam0} \\ y_{cam0} \\ 1 \end{bmatrix} = (H_{ZA} + Z \cdot dH) \begin{bmatrix} x_{cam1} \\ y_{cam1} \\ 1 \end{bmatrix} \quad (1)$$

(Mathematical Expression 2)

$$\lambda' \begin{bmatrix} x_{cam1} \\ y_{cam1} \\ 1 \end{bmatrix} = (H_{ZA}^{-1} + Z \cdot dH^{-1}) \begin{bmatrix} x_{cam0} \\ y_{cam0} \\ 1 \end{bmatrix} \quad (2)$$

(Mathematical Expression 3)

$$dH = \frac{1}{(ZB - ZA)}(H_{ZB} - H_{ZA}) \quad (3)$$

In the expressions (1) to (3), $H_{ZA}$ is a homography matrix corresponding to the height ZA, and $H_{ZB}$ is a homography matrix corresponding to the height ZB. Both of these matrices $H_{ZA}$ and $H_{ZB}$ have a size of 3×3. Further, $\lambda$ and $\lambda'$ are prescribed constants.

The expression (1) above can be used for obtaining the coordinate of the corresponding point $p_0$ on the image A0 from the coordinate of the point $p_1$ on the image A1. Further, the expression (2) can be used for obtaining the coordinate of the corresponding point $p_1$ on the image A1 from the coordinate of the point $p_0$ on the image A0. By substitution of an arbitral height for Z in each of these expressions, a point on each of the images A0 and A1 which corresponds to a point at the arbitral height can be detected.

In this example, specification of the height measurement range in an arbitrary range is accepted, and based upon the principle described in "SUMMERY OF THE INVENTION", the measurable range corresponding to the height measurement range is extracted.

It is to be noted that coordinates of four vertices of each of the images A0 and A1 are used in extraction of the measurable range, and since these images are identical in size, the coordinates of the four vertices of the respective images are identical. For example, when the pixel number in a horizontal direction is 512 and the pixel number in a vertical direction is 484, the respective coordinates of the four vertices are (0, 0), (511, 0), (511, 483), (0, 483).

Figure 6:
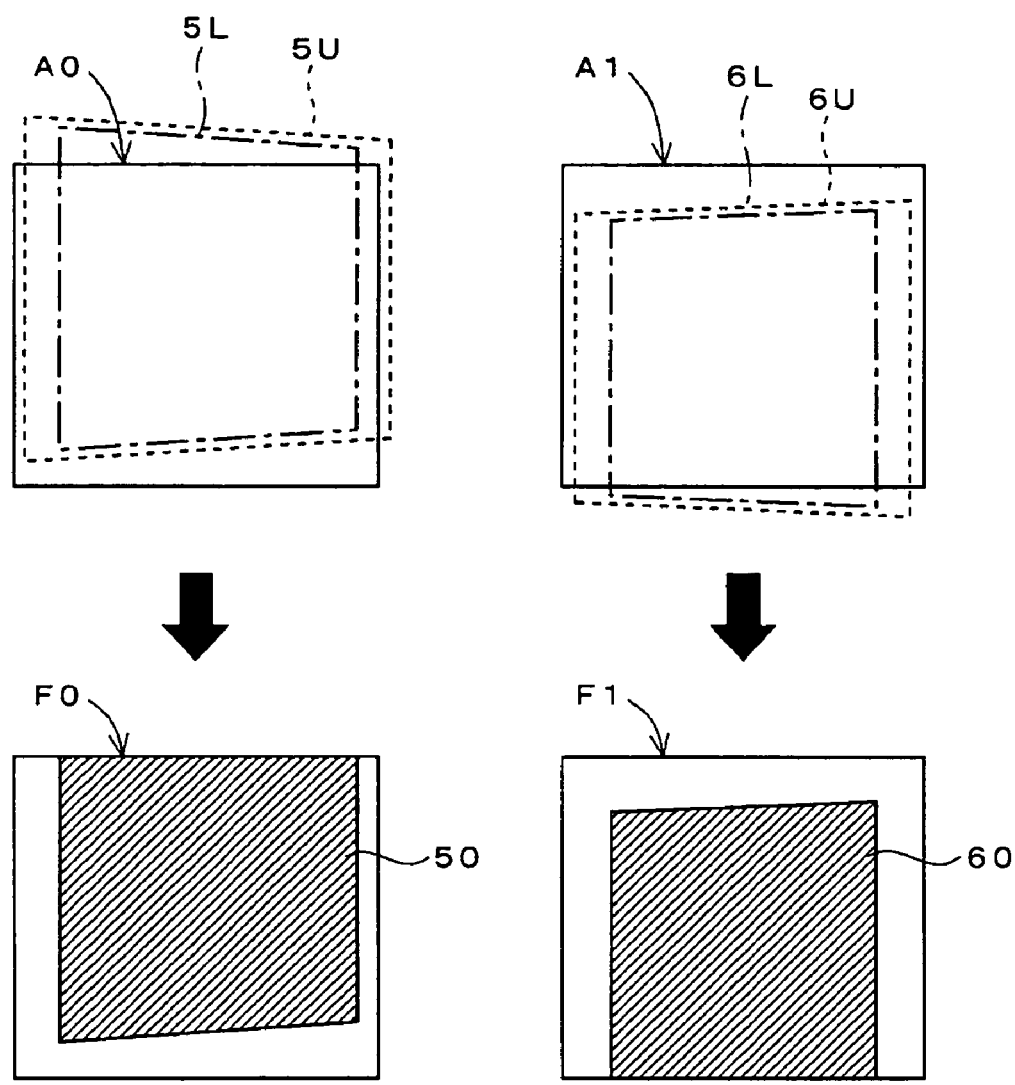
FIG. 6 shows an explanatory view of a method for extracting a measurable range.

FIG. 6 specifically shows a method for extracting a measurable range. In this example, it is assumed that the lower limit of the height measurement range is ZL and the upper limit of the same is ZU. The expression (1) is executed when Z=ZL and Z=ZU, assuming that a coordinate of four vertices of the image is ($x_{cam1}$, $y_{cam1}$), to obtain four points as ($x_{cam0}$, $y_{cam0}$) at each of the height ZL and ZU. Regions 5L and 5U each having the obtained four points as vertices are set on the image A0. (Namely, connecting the four points obtained by executing the expression (1) when Z=ZL gives the region 5L, while connecting the four points obtained by executing the expression (1) when Z=ZU gives the region 5U.) A part 50 where the regions 5L and 5U overlap in the range of the coordinates of the image A0 is extracted as a measurable range corresponding to the height measurement range.

The grounds for the extraction processing are simply described. Since respective points at the heights ZL and ZU can appear in arbitrary positions on either of the images A0 and A1, when the whole range of the image A1 is converted to the image A0 by use of homography matrices according to the respective heights, the region 5L after the conversion is considered to correspond to a point included in the viewing field of the camera C1 among points at the height ZL. Similarly, the region 5U is considered to correspond to a point included in the viewing field of the camera C1 among points at the height ZU. It is therefore possible to measure a three-dimensional coordinate in the part 50 included in the range of the image A0 in each of the regions 5L and 5U (part included in the viewing field of the camera C0), and the part 50 can thus be regarded as the measurable range.

Also as for the image A1, based upon the same principle as above, the expression (2) is executed when Z=ZL and Z=ZU, assuming that a coordinate of four vertices of the image is ($x_{cam0}$, $y_{cam0}$), to obtain four points as ($x_{cam1}$, $y_{cam1}$), and regions 6L and 6U each having the obtained four points as vertices are set. A part 60 where the regions 6L and 6U overlap within the range of coordinates of an actual image is extracted as a measurable range corresponding to the height measurement range.

Figure 7:
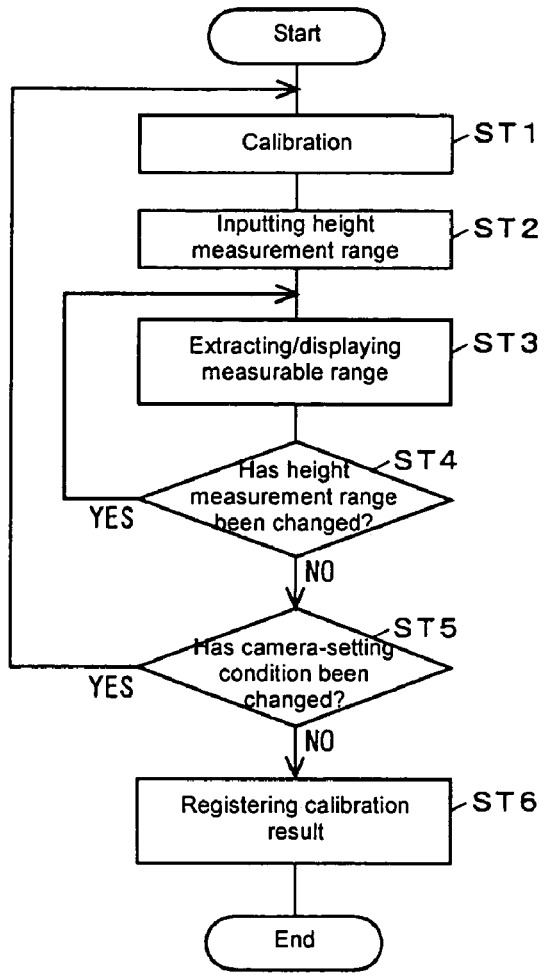
FIG. 7 shows a flowchart of a procedure for setting a camera while displaying a measurable range.

FIG. 7 shows a procedure for setting prior to measurement processing.

This procedure starts after installation of the work for calibration in an image-pickup object position, positioning of the cameras C0 and C1 over the work for calibration, and adjustment of magnification of each of the cameras, inclination of the optical axis of the camera C1 and the like.

In a first step, ST1 (ST is an abbreviation of "step", and this also applies hereinafter), an image of the work for calibration is picked up with each of the cameras C0 and C1, and using the produced front view image A1 and inclined image A2, a variety of parameters required for three-dimensional measurement are calculated.

It is to be noted that obtaining all parameters required for the three-dimensional measurement requires multiple image pickups while changing the height of the work for calibration and subsequent extraction of a plurality of feature points necessary for calibration from each of the picked up images. Properly obtaining these parameters enables the three-dimensional measurement to be properly performed and the homography matrices $H_{ZA}$ and $H_{ZB}$ to be obtained.

When the calibration is completed, in ST2, an input of the height measurement range is accepted. In a next step, ST3, measurable ranges 50 and 60 on the images A0 and A1 are respectively executed by the method shown in FIG. 6. Further, based upon the execution results, the measurable ranges 50 and 60 on the images A0 and A1 are color-displayed on the monitor 3, as shown in FIG. 4.

The user looks at this display screen to determine whether or not the measurable range is appropriate. Here, when the measurable range is inappropriate, the user can change the height measurement range. With the change in specified range, ST4 becomes "YES", and the process returns to ST3 to re-extract a measurable range according to a height measurement range after the change. Further, the display of the monitor 3 is also updated according to the re-extraction of the measurable range.

Meanwhile, when the measurable range is intended to be adjusted without changing the height measurement range, the user changes the camera-setting conditions. In this case, ST5 becomes "YES", and the process returns to ST1, where the process is restarted from the calibration.

On the other hand, when the measurable range is appropriate, the user executes a registered operation without changing neither the height measurement range nor the camera-setting conditions. Thereby, both ST4 and ST5 become "NO", and the process goes to ST6 to register the parameters and the like, obtained in the calibration, into the parameter storage part 27.

According to the above example, the user can specify the height measurement range to readily check the range of the degree of the width in which a point within the height measurement range can be measured. In particular, since the front view image A0 shows the states of the work W and its supporting surface seen from the top, the user can check a relation similar to a relation of a measurable range with respect to an actual work W and its supporting surface.

Therefore, even without expertise on the three-dimensional measurement, it is possible to readily and appropriately set the cameras. Further, since the height measurement range can be freely specified, it is possible to make an inspection apparatus correspond to a variety of works W, so as to provide a highly versatile inspection apparatus.

It should be noted that, although the measurable range was displayed according to calibration processing in the above example, this display can also be made during measurement processing. In this case, the user can execute measurement while checking whether or not the work W properly falls within the measurable ranges 50 and 60 on the screen. Thereby, the user can readily determine, in the case of detecting a defect, whether the defect is a real defect or caused by inappropriate positioning or attitude of the work.

The next example is applied to processing for setting a measurement region by use of a good work W and registering setting conditions for the region (position and size of the region).

Figure 8:
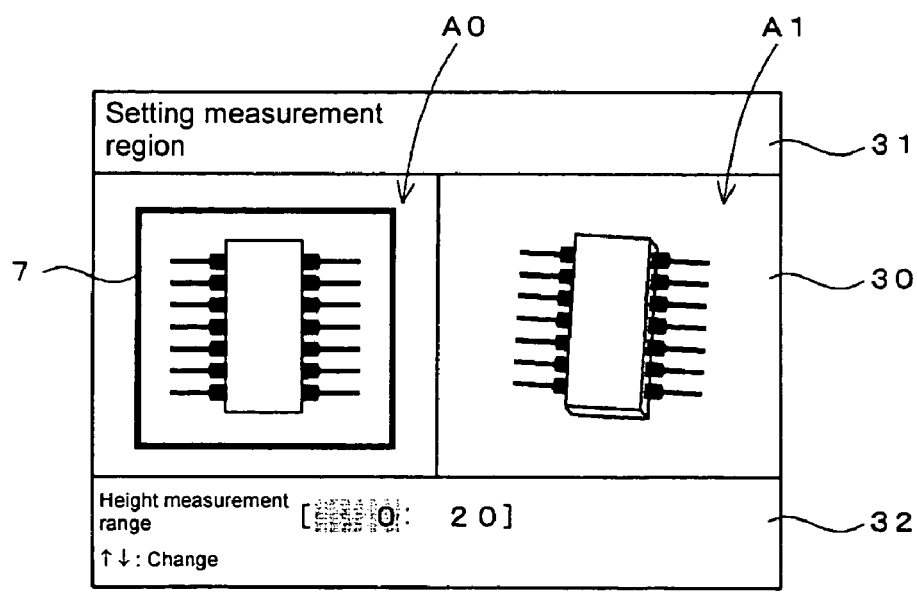
FIG. 8 shows an explanatory view of an example of specifying a measurement region.

FIG. 8 shows an example of setting a measurement region. Also in this example, the cameras C0 and C1 are simultaneously driven and the obtained front view image A0 and inclined view A1 are displayed in parallel with each other in the region 30. Further, specification of a measurement region 7 is accepted in such a manner as setting a cursor (not shown) for range specification on the display screen of the front view image A0.

When the setting conditions of the measurement region 7 are registered and measurement is started, the measurement region 7 is set with respect to the work W at each time based upon the registered conditions, and measurement processing is executed on a point included in the region 7. However, when a point in an intended height range does not appear in a region corresponding to the measurement region 7 on the image A1 side, a three-dimensional coordinate of that point cannot be measured.

In view of the above-mentioned problem, in a second example, specification of a height measurement range is accepted prior to specification of the measurement region 7, and a measurable range corresponding to the specified height measurement range is extracted. When the measurement region 7 is specified in a range exceeding the measurable range, the specification is not accepted and an error message is displayed.

Figure 9:
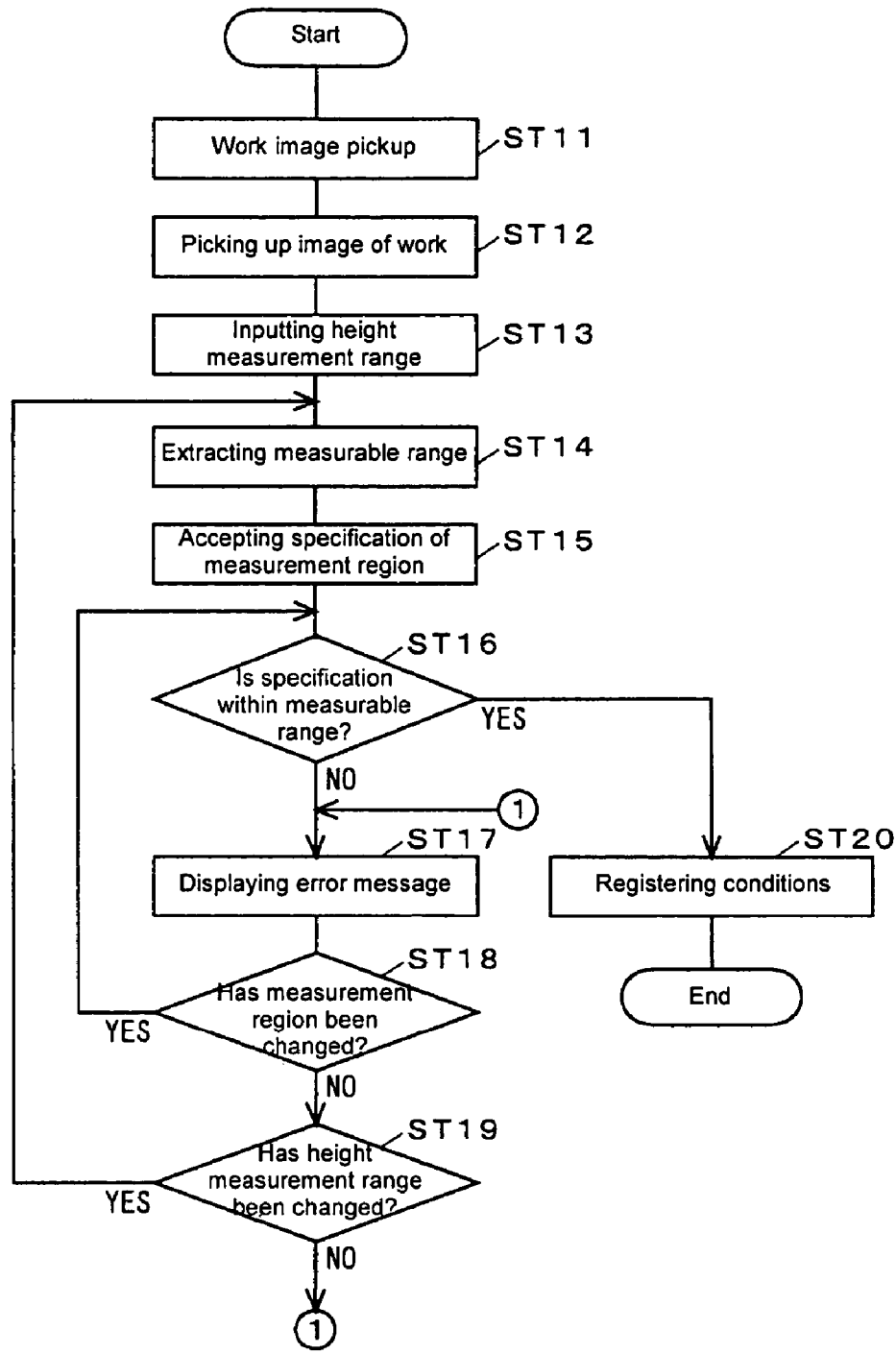
FIG. 9 shows a flowchart of setting a measurement region suitable for a measurable range.

FIG. 9 shows a procedure for setting the measurement region 7. This procedure is performed after completion of the calibration. In a first step, ST11, images of the good work W are picked up. In a next step, ST12, the front view image A0 and the inclined image A1 produced in ST11 are displayed on the monitor 3.

In a next step, ST13, specification of the height measurement range is accepted. In ST14, a measurable range according to this specification is extracted. It is to be noted that in this example, the measurable range is required for determining the propriety of the measurement region 7 with respect to the front view image A0, and therefore only the measurable range on the front view image A0 may be extracted.

In ST15, specification of the measurement region 7 is accepted. When the measurement region 7 specified here is included in the measurable range, ST16 becomes "YES", and the process goes to ST20 to register setting conditions for the measurement region 7.

On the other hand, when the measurement region 7 is specified in a range exceeding the measurable range, ST16 becomes "NO", and the process goes to ST17 to display a prescribed error message in the region 31 for information display. When the user changes the measurement region 7 according to this display, ST18 becomes "YES", and the process returns to ST16. With the measurement region 7 thereby included in the measurable range, the process goes to ST20 to resister the setting conditions for the measurement region 7 which was changed above.

Meanwhile, when the user does not intend to change the measurement region 7, the height measurement range is changed. In this case, ST18 becomes "NO" while ST19 becomes "YES", and the processing is performed again from above-mentioned ST14.

It should be noted that, when the user intends to change neither the measurement region 7 nor the height measurement range, it is necessary to cancel the processing in FIG. 9 to change the camera-setting conditions, and then perform the processing again from the calibration.

According to the above processing, it is possible to perform stable measurement since there is no risk of setting the measurement region 7 in a range where a point in a specified height measurement range cannot be measured. In addition, although an error message was displayed when specification of the measurement region 7 was not appropriate in the above example, in place of this, a range where the measurement region 7 can be specified may be limited. For example, it is possible to prevent the cursor from moving out of the extracted measurable range, or to limit the display of the image A0 to the measurable range so as to specify the measurement region 7 only within the displayed range.

Figure 10:
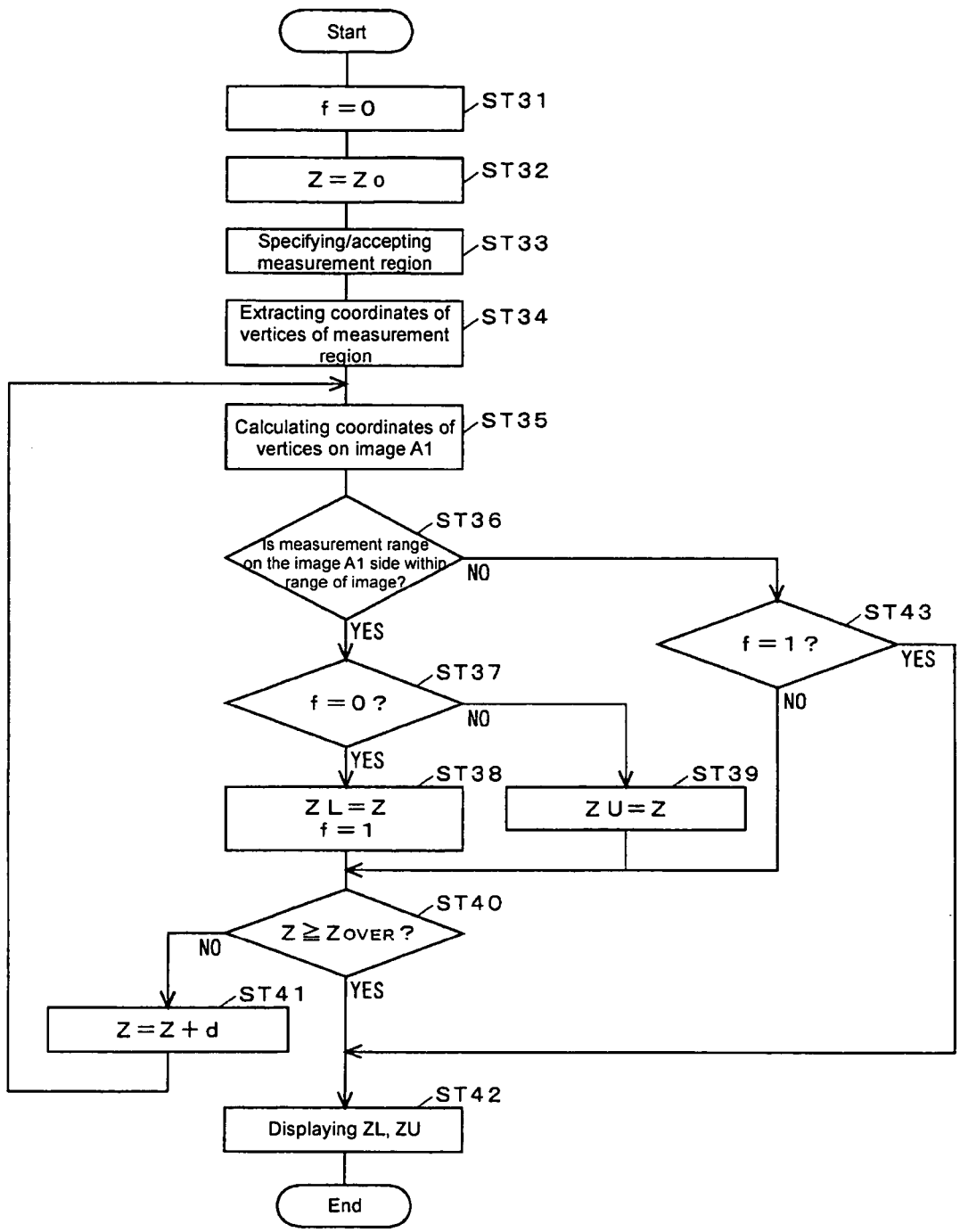
FIG. 10 shows a flowchart of a procedure for accepting specification of the measurement range and displaying a measurable height range.

In an example shown in FIG. 10, after specification of the measurement region 7 has been accepted on the front view image A0, a measurable height range is calculated within the specified measurement region, and the calculation result is displayed on the monitor 3. Hereinafter, a description is given along the flow of FIG. 10.

In a first step, ST31, a flag f is reset to zero. In addition, this flag f serves to store that the lower limit ZL of the height range has been set.

In a nest step, ST32, the height Z is set to a prescribed initial value $Z_0$. In a subsequent step, ST33, specification of the measurement region 7 is accepted on the front view image A0 in the same manner as shown in FIG. 8. When the specification is completed, the process goes to ST34 to extract a coordinate of each vertex of the measurement region from the front view image A0.

In ST35, the respective coordinates of the four vertices are substituted in the expression (2), to convert the coordinates of the vertices for coordinates on the inclined image A1 side. It should be noted that the initial value $Z_0$ is substituted for Z in the expression (2) in the first setting in ST35.

In ST36, it is determined whether the coordinates of the vertices which were obtained in ST35 fall within the range of the coordinates of the image A1. Here, if any one point is out of the image A1, ST36 becomes "NO", and the process goes to ST43. Since the flag f is 0 at this time, ST43 also becomes "NO", and the process goes to ST40.

In a next step, ST40, a current value of the height Z is compared with a previously-set limited value $Z_{over}$. Since $Z<Z_{over}$ when Z is the initial value $Z_0$, ST40 becomes "NO", and the process goes to ST41 to update the height Z to a value added with a prescribed value d. Subsequently, the process returns to ST35 to execute conversion processing on the vertices of the measurement region 7 according to the expression (2) with the updated Z substituted therein.

When the height Z becomes a prescribed value as a result of repetition of the above flow, if all the vertices obtained in ST35 are determined to be included in the range of the image A1, ST36 becomes "YES". With this "YES" determination accepted, the flag f is checked in a next step ST37, and since f=0 at this stage, the process goes to ST38.

In ST38, the current value of the height Z is set to the lower limit ZL and the flag f is set to 1.

Thereafter, as the height Z increases by the prescribed value d, ST35 and ST36 are executed. When the determination in ST36 becomes "YES" after the flag f has been set to 1, a next step, ST37 becomes "NO". Thereby, the process goes to ST39 to set the current value of the height Z to the upper limit ZU of the height range.

Thereafter, so long as the measurement region on the image A1 obtained by use of the updated height Z falls within the range of the image A1, the processing proceeds along the flow of ST36, ST37 and ST39, and the upper limit ZU of the height range is updated.

When the measurement region on the image A1 side exceeds the range of the image A1, ST36 becomes "NO" while ST43 becomes "YES", and the process goes to ST42. Further, even with the measurement region within the range of the image A1, when the height Z reaches the limited value $Z_{over}$, ST40 becomes "YES", and the process goes to ST42.

In ST42, the lower limit ZL and the upper limit ZU at that time are displayed on the monitor 3, to notify the user of the measurable height range.

According to the above example, since the user can specify the measurement region 7 to see a measurable height range within the region 7, so as to readily recognize whether or not measurement according to some purpose is possible. It should be noted that, although the measurement region 7 can be specified again to deal with a case where the height range does not meet the purpose, if the setting of the measurement region 7 is not intended to be changed, it is necessary to change the camera-setting conditions and perform calibration again.

What is claimed is:

1. A three-dimensional measuring method for executing three-dimensional measurement processing on a range where viewing fields of a plurality of cameras overlap by using images produced with the plurality of cameras, wherein the method comprising:

a first step of accepting specification of a range of height to be measured; and a second step of extracting, with respect to an image produced with at least one of said cameras, an area where a point which is included in the viewing fields of all the cameras throughout the height range specified in the first step appears on the image by using a relation of a camera coordinate system between each of the cameras.

2. A three-dimensional measuring method according to claim 1, wherein the method comprising:
a third step of displaying an image produced with the camera as an object for processing of the second step, along with the area extracted in the second step.

3. A three-dimensional measuring method according to claim 1, wherein
the first step further includes a step of accepting specification of a measuring object range on a supporting surface of an object to be measured, and
the method executes:
a fourth step of determining with respect to the camera as the object for the processing of the second step whether or not the measuring object range on the image is included in the area extracted in the second step; and
a fifth step of outputting a result of the determination in the fourth step.

4. A three-dimensional measuring method according to claim 1, wherein the method comprising:
a sixth step of displaying an image from the camera as the object for the processing of the second step while accepting specification of a measuring object range in a region corresponding to the area extracted in the second step.

5. A three-dimensional measuring method for executing three-dimensional measurement processing on a range where viewing fields of a plurality of cameras overlap by using images produced with the plurality of cameras, wherein the method comprising:
a first step of accepting specification of a measuring object range on a supporting surface of an object to be measured;
a second step of obtaining a height range of a point included in the viewing fields of all the cameras among points belonging to the measuring object range by using a relation of a camera coordinate system between each of the cameras; and
a third step of outputting the height range obtained in the second step.

6. A three-dimensional measuring apparatus for executing three-dimensional measurement processing on a range where viewing fields of a plurality of cameras overlap by using images produced with the plurality of cameras, the apparatus comprising:
an input device for inputting a range of height to be measured; and
an area extracting device for extracting, with respect to an image produced with at least one of the plurality of cameras, an area where a point which is included in the viewing fields of all the cameras throughout the height range inputted by the input device appears on the image by using a relation of a camera coordinate system between each of the cameras.

7. A three-dimensional measuring apparatus according to claim 6, comprising:
a display image producing device for producing a display image that represents an image, produced with the camera as an object for processing of the area extracting device, along with the area extracted by the area extracting device; and
an image outputting device for outputting the display image.

8. A three-dimensional measuring apparatus according to claim 6, comprising:
a first range specification accepting device for displaying on a display screen an image from any one of the plurality of cameras while accepting an operation of specifying a measuring object range on the display screen;
a determining device for determining whether or not the specified measuring object range is included in the area extracted by the area extracting device; and
an output device for outputting a result of the determination by the determination device,
wherein the area extracting device extracts the area with respect to the camera as an object for range specification of the range accepting device.

9. A three-dimensional measuring apparatus according to claim 6, comprising a second range specification accepting device for displaying an image from the camera as the object for the processing of the area extracting device and accepting specification of a measurement range within the area on the image extracted by the area extracting device.

10. A three-dimensional measuring apparatus for executing three-dimensional measurement processing on a range where viewing fields of a plurality of cameras overlap by using images produced with the plurality of cameras, the apparatus comprising:
a range specification accepting device for displaying an image from any one of the plurality of camera while accepting an operation of specifying a measuring object range on this display screen;
a height-range extracting device for extracting, upon the operation of specifying a measuring object range, a height range of a point included in the viewing fields of all the cameras among points belonging to the measuring object range in spaces by using a relation of a camera coordinate system between each of the cameras; and
an output device for outputting the height range obtained by the height-range extracting device.

* * * * *